United States Patent
Acharya et al.

(10) Patent No.: US 7,302,608 B1
(45) Date of Patent: Nov. 27, 2007

(54) SYSTEMS AND METHODS FOR AUTOMATIC REPAIR AND REPLACEMENT OF NETWORKED MACHINES

(75) Inventors: Anurag Acharya, Campbell, CA (US); Bogdan Cocosel, Mountain View, CA (US); Catalin T. Popescu, Mountain View, CA (US); Eugene L. Jhong, Mountain View, CA (US); Peng-Toh Sim, Mountain View, CA (US)

(73) Assignee: Google Inc., Mountain View, CA (US)

( * ) Notice: Subject to any disclaimer, the term of this patent is extended or adjusted under 35 U.S.C. 154(b) by 490 days.

(21) Appl. No.: 10/816,594

(22) Filed: Mar. 31, 2004

(51) Int. Cl.
*G06F 11/00* (2006.01)

(52) U.S. Cl. ............................................ 714/13; 714/7

(58) Field of Classification Search .................. 714/7, 714/13, 44
See application file for complete search history.

(56) References Cited

U.S. PATENT DOCUMENTS

| | | | | |
|---|---|---|---|---|
| 5,579,511 A * | 11/1996 | Cavasa et al. | ................. | 703/27 |
| 5,596,569 A * | 1/1997 | Madonna et al. | ........... | 370/217 |
| 5,790,775 A * | 8/1998 | Marks et al. | ................... | 714/9 |
| 6,092,169 A * | 7/2000 | Murthy et al. | ............... | 711/170 |
| 6,219,801 B1 * | 4/2001 | Yuge et al. | .................... | 714/13 |
| 6,671,699 B1 * | 12/2003 | Black et al. | ................. | 707/201 |
| 6,922,791 B2 * | 7/2005 | Mashayekhi et al. | ........... | 714/4 |
| 6,959,268 B1 * | 10/2005 | Myers, Jr. et al. | ............... | 703/6 |
| 7,120,690 B1 * | 10/2006 | Krishnan et al. | ........... | 709/225 |
| 2003/0074598 A1 * | 4/2003 | Bossen et al. | ................. | 714/6 |
| 2003/0237017 A1 * | 12/2003 | Jibbe | ............................. | 714/4 |
| 2005/0026486 A1 * | 2/2005 | Thomas | ...................... | 439/188 |

* cited by examiner

*Primary Examiner*—Scott Baderman
*Assistant Examiner*—Paul F. Contino
(74) *Attorney, Agent, or Firm*—Jung-hua Kuo (57) ABSTRACT

Systems and methods for automatic repair and replacement of computing machines are disclosed. The system may generally include a database including configuration information for the available replacement machines and a failed machine, a machine assignment module to assign a replacement machine based on a comparison of the configuration information for the failed machine and the available replacement machines, and a configuration module for generating configuration data for replacement of the failed machine with the replacement machine in the computer network. The machine assignment module may compare certain configuration parameters such as processor speed, disk drive size, and/or amount of RAM, between the failed machine and the available replacement machines. A replacement module may copy data from another copy of the failed machine in the computer network into the replacement machine. An installation module may install the configuration data in, e.g., dependent machines, and restart the dependent machines.

32 Claims, 4 Drawing Sheets

SYSTEMS AND METHODS FOR AUTOMATIC REPAIR AND REPLACEMENT OF NETWORKED MACHINES

BACKGROUND OF THE INVENTION

1. Field of the Invention

The present invention relates generally to a network of computers. More specifically, systems and methods for automatic repair and replacement of computing machines are disclosed.

2. Description of Related Art

Many of today's more complex computing systems such as computer server systems often include numerous machines gathered in clusters such as a server farm. A server farm may be housed in a data center such as a collocation and may include thousands of computing machines. The machines are typically loaded with one or more server applications and allocated by use, e.g., front end, backend, etc. Over time, various machines may need to be modified, e.g., repaired, or replaced. As an example, each machine may have an average service life of approximately four years. Thus, in addition to the machines that are in active use, the server farm typically also includes various free or unassigned machines that are provided as possible replacements. These replacement machines typically have various configurations such that a replacement machine with the same or similar configuration as the out of service machine being replaced may be selected.

To modify or repair a machine or to replace an out of service machine with a replacement machine generally require the manual intervention by a system administrator. The system administrator may first attempt to identify the problem, fault or exception on the machine to determine whether to modify or repair the machine. If the fault should be resolved by replacing the machine, the system administrator may select a replacement machine from a database of replacement machines to select the machine with the same or similar configurations as the machine being replaced.

As such manual intervention is tedious, expensive, labor intensive and time consuming, it would be desirable to provide a system and method for automatically repairing or replacing a problem machine.

SUMMARY OF THE INVENTION

Systems and methods for automatic repair and replacement of computing machines are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system for automatic replacement of machines in a computer network may generally include a database including configuration information for the available replacement machines and a failed machine, a machine assignment module to identify and assign one of the available replacement machines as a replacement machine based on a comparison of the configuration information for the failed machine to that of the available replacement machines, and a configuration module for generating configuration data for replacement of the failed machine with the replacement machine in the computer network. The database may include configuration information for active machines in the computer network. The machine assignment module may compare certain configuration parameters such as processor speed, disk drive size, and/or amount of RAM, between the failed machine and the available replacement machines. The machine assignment module may also keep track of the relative priorities of the one or more servers on each machine so as to allocate based on the relative priorities. For example, a server with higher processing power requirements may have a higher priority for more powerful machines.

The system may further include an installation module to cause the configuration data to take effect in at least some of the other machines in the computer network such as those that are dependent upon the failed machine. The system may also further include a detection module to detect fault in a software and/or hardware component in the machines in the computer network and a repair module to attempt to repair the fault identified by the detection module in the failed machine. The system may further include a replacement module that copies data from another copy of the failed machine in the computer network, e.g., a front end server (e.g., for providing the user interface for interfacing with the end users), a load balancer (e.g., for distributing the load of a web site or other service to multiple physical servers), an index server (e.g., for indexing contents and properties of documents on the Internet or an intranet), or a cache server (e.g., for performing data replication or mirroring), into the replacement machine.

In another embodiment, a method for automatic replacement of machines in a computer network generally includes identifying a failed machine in the computer network, performing a lookup in a database containing configuration information for the available replacement machines and the failed machine, identifying and assigning a replacement machine based on a comparison of the configuration information for the failed machine and the available replacement machines, and generating configuration data for replacement of the failed machine with the replacement machine in the computer network.

In yet another embodiment, a computer program product embodied on a computer-readable medium, the computer program product including instructions which when executed by a computer system are operable to cause the computer system to perform acts generally including identifying a failed machine in the computer network, performing a lookup in a database containing configuration information for the available replacement machines and the failed machine, identifying and assigning a replacement machine based on a comparison of the configuration information for the failed machine and the available replacement machines, and generating configuration data for replacement of the failed machine with the replacement machine in the computer network.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for automatic repair and replacement of computing machines are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
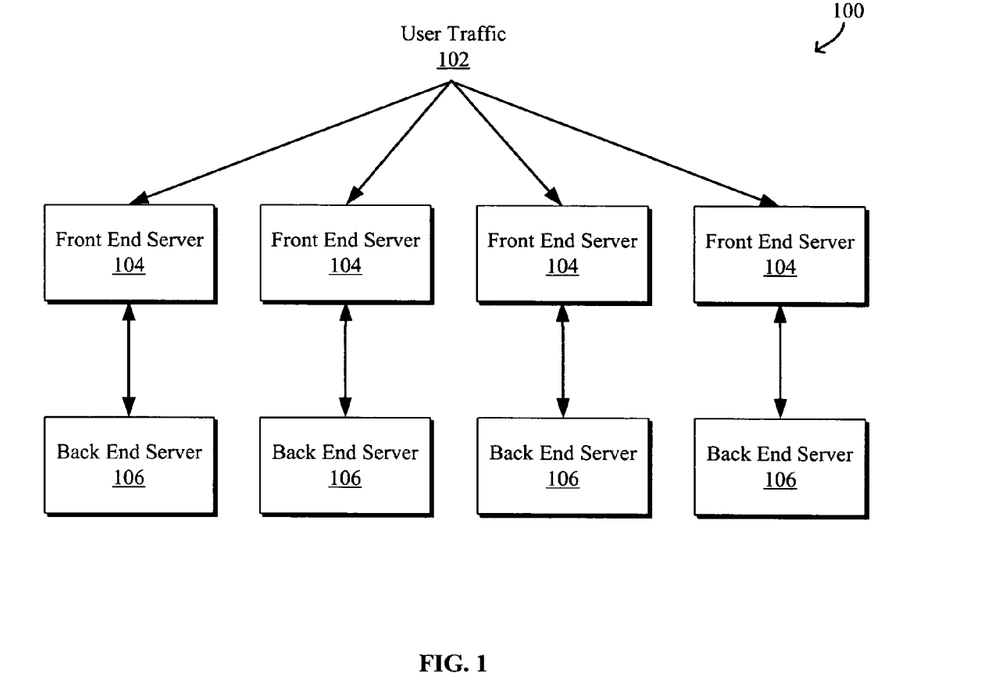
FIG. 1 is a block diagram of an illustrative server farm or a clustered computer network.

FIG. 1 is block diagram of an illustrative server farm or clustered computer network 100. It is noted that the computer network 100 may be located in a single location or multiple different physical locations. The computer network 100 generally includes front end servers 104 that receive and transmit user traffic 102 to the end users. The front end servers 104 interface with backend servers 106 that provide various services such as indexing, storage, caching, searching, balancing, and/or various other processing functions, etc. It is noted that as used herein, a machine generally refers to a physical unit such as a component box containing one or more processors, disk drives, memory, power supply, etc., while a server generally refers to the one or more applications running on the machine, i.e., a given machine may be running one or more servers. Although one exemplary server farm or clustered computer network 100 is shown, the systems and methods for automatic network machine repair and replacement as described herein may be similarly applied to various other computer network configurations.

Figure 2:
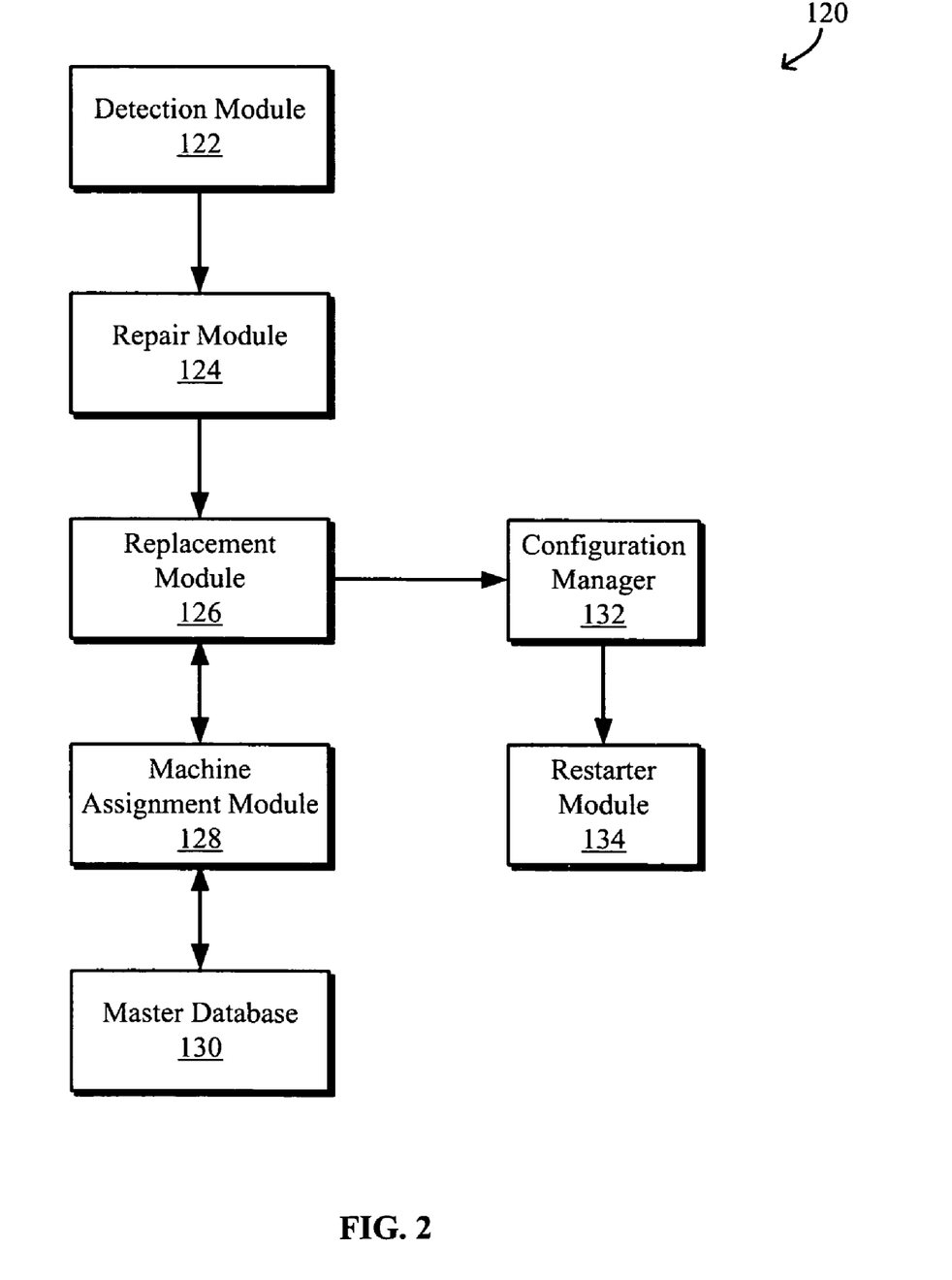
FIG. 2 is a block diagram of an illustrative automatic network machine monitor, repair and replacement system.

FIG. 2 is a block diagram of an illustrative automatic network machine monitor, repair and replacement system 120. The system may generally include a detection module 122, a repair module 124, a replacement module 126, a machine assignment module 128, a master database 130, a configuration manager 132, and a restarter module 134. Although separate components of the system 120 are shown and described for purposes of clarity, the functions of any subset or all of the various components may be integrated into a single component. The automatic network machine monitor, repair and replacement system 120 may be utilized to manage and control a computer network that includes one or more computer clusters, either locally or remotely. The system 120 facilitates in monitoring and replacing dead servers with new replacement clones with minimal or without system administrator or other manual intervention. The system 120 may monitor various other parameters or data points and detects and generates alerts when predetermined thresholds are reached or exceeded. For example, the system 120 may monitor and detect that a disk is defective on a certain machine, that there is a high average load on a given service, that there is a high collocation-wide average temperature, and the like. The detection module 122 may be configured to monitor all (or a subset of) the machines in the computer network 100. The detection module 122 may be configured with various rules to determine when software and/or hardware components of the individual machines in the computer network 100 may be defective, dead or otherwise malfunctioning or failed. In particular, the detection module 122 may monitor the software and/or hardware components of the individual machines in the computer network 100. For example, the detection module 122 may monitor for any defective, dead, or malfunctioning disk drives, memory, processors, etc.

If the detection module 122 detects any defective, dead, or otherwise malfunctioning software or hardware components of a particular machine in the computer network 100, a token or trouble ticket identifying the particular machine and the problem is forwarded to the repair module 124. In particular, the repair module 124 receives a message from the detection module 122 that identifies which machine has a problem as well as the problem(s) detected and attempts to repair the problem(s). The repair module 124 may be configured with various rules to determine what repairs, if any, are to be performed. In one configuration, the repair module 124 may limit the amount or number of repairs the repair module 124 performs. For example, the repair module 124 may limit the amount of repairs for the overall network 100, for particular types of problems (e.g., memory problems, disk drive problems, etc.), for the types of machines (e.g., index servers, cache servers, front end servers, balancers, etc.). Additionally or alternatively, the repair module 124 may be configured with rules and/or safety checks that determine whether and what repairs to perform based on the severity, history, and/or frequency of the problem, for example. In general, the detection module 122 may be configured to report problems exhaustively while the repair module 124 may be configured to determine reasons that certain repair actions should not be performed and thus limit the triggering of repair actions.

If the detected problem is one that the repair module 124 will attempt to repair, the repair module 124 may classify the type of the problem and attempt the repair. If the repair module 124 fails to repair the problem and/or determines that the particular machine should be replaced, e.g., without attempting to repair, the trouble ticket may be forwarded to the replacement module 126. To limit the triggering of replacement actions forwarded to the replacement module 126, the repair module 124 may be configured with safety checks. As an example, the detection module 122 may detect that a given machine has a slightly defective disk, i.e., a defect or problem that may be fixed and does not currently require replacement, and issues a token to the repair module 124. The repair module 124 determines that the problem may be fixed and initiates a repair action. When the repair action is complete, the repair module 124 closes the repair action and forwards the token back to the detection module 122, which is continually or continuously performing its detection loop, to determine if the problem was actually fully fixed. If the detection module 122 still detects the problem, the detection module 122 issues the token again and forwards the token to the repair module 124 again to trigger the fix action. The repair module 124 (and/or optionally the detection module 122) may keep track of the number of times and when the repair(s) were attempted and may be configured to manage the frequency of the repair, i.e., how soon after the previous repair should the repair module 124 attempt the repair again. The repair module 124 may also be configured to limit the number of repairs of the same problem and/or limit the number of the same repairs for the particular machine, etc. When the maximum number of repair attempts is reached, e.g., 5 repair attempts, the repair module 124 may terminate the repair cycle, for example, by modifying the token to indicate that the problem is not repairable and forwarding the modified token back to the detection module 122. The modification of the token thus converts the token to a different problem type for which the prescribed action is replacement of the machine. The machine may then be declared unusable and a replacement action may be triggered.

To trigger a replacement action, the replacement module 126 forwards the identification of the machine to the machine assignment module 128 so as to identify a best match replacement machine from the pool of available replacement machines for the particular failed machine. The machine assignment module 128 in turn interfaces with the master database 130 which contains a list of all the machines in the computer network, including those in the pool of available replacement machines. For each machine, the list in the master database 130 may include each machine's identification and the particular configuration, e.g., processor speed, disk drive size, and/or amount of RAM, etc. The machine assignment module 128 performs a lookup in the master database 130 of the failed machine to be replaced to determine the configurations of the failed machine. The machine assignment module 128 then determines the best match replacement machine from the list of available replacement machines in the master database 130. Typically, each machine in the pool of available replacement machines is up and running but not yet assigned and thus available for assignment. The machine assignment module 128 then assigns the selected best match machine as the replacement machine and executes an automatic script to copy, mirror or clone the new replacement machine with data from another copy of the machine being replaced, e.g., another copy of the same index server or same balancer, etc.

Once the new replacement machine is mirrored with data from another copy of the machine being replaced, the new replacement machine is ready to be installed in the computer network. Specifically, the configuration manager 132 generates a new configuration file (or multiple configuration files, depending on the particular implementation, for example) that takes into account replacement of the failed machine with the new replacement machine in the computer network. The configuration manager 132 forwards the new configuration file to the installation or restarter module 134 and optionally also forwards a request to replace the failed machine with the new replacement machine as a redundant safety measure.

The restarter module 134 performs the installation of the replacement machine in the computer network by updating or installing the configuration files of the other machines in the computer network that are in the failed machine's chain of dependency.

The restarter module 134 performs the installation of the replacement machine in the computer network by restarting the binary on the target machine so its command line reflects the newly added machine(s).

configuration files generated by the replacement module 126 are moved from Perforce (at corp) to the babysitters (in production) where the restarter modules 134 are (there is one babysitter/restarter per coloc while there is a single, central, configuration manager 132.

Specifically, the failed machine's chain of dependency includes the other machines in the computer network that are affected by the replacement of the failed machine. For example, the restarter module 134 may parse the configuration files, build the hierarchy, and enforce, for example, that machines performing function A communicate with machines performing function B, machines performing function B communicate with machines performing function C, etc. The restarter module 134 may run an automatic script that instructs the machines dependent on the failed machine to modify or update its configuration file with the new configuration file as generated by the configuration manager 132. The restarter module 134 may also cause the modified dependent machines to restart in order for the new configuration data to take effect. Generally, the restarter module 134 may also function as a babysitter of the machines of the computer network, e.g., by monitoring for dead or non-executing machines in general and, upon finding a dead machine, executing an automated script to restart the dead machine.

Figure 3:
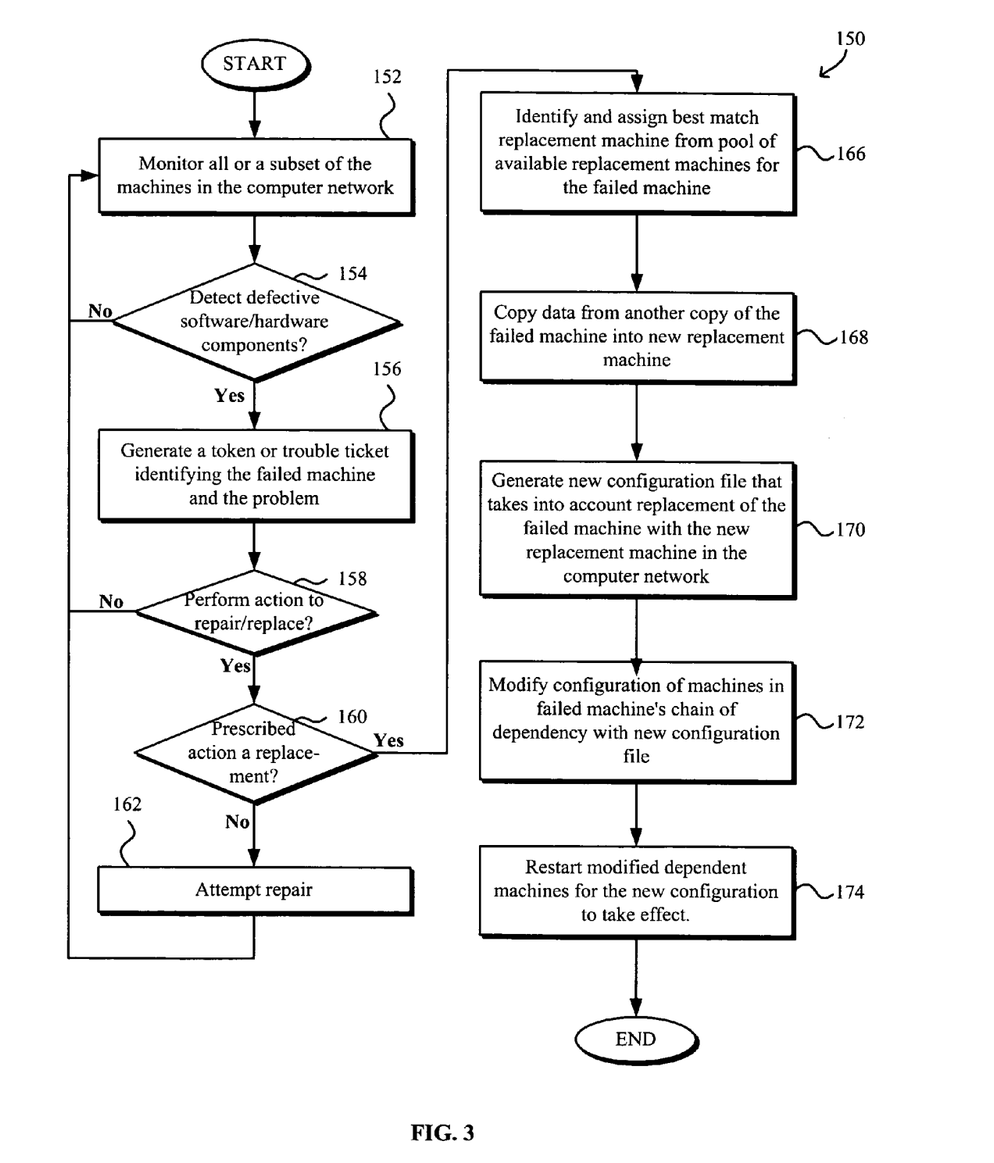
FIG. 3 is a flowchart illustrating a process for automatically monitoring, repairing and replacing machines over a network.

FIG. 3 is a flowchart illustrating a process 150 for automatically monitoring, repairing and replacing machines over a network. The automatic process 150 may be utilized to manage and control, either locally or remotely, a computer network that includes one or more computer clusters that may be located in one or multiple physical locations. The process 150 facilitates in the automatic monitoring and replacing of dead servers with new replacement cloned machines with minimal or without system administrator or other manual intervention.

At block 152, all or a subset of the machines in the computer network are monitored. Various rules may be employed to facilitate in determining when software and/or hardware components of the individual machines in the computer network may be defective, dead, failed, or otherwise malfunctioning. For example, individual components such as disk drives, memory, processors, etc. of each machine may be monitored for any defect or malfunction.

If no defect or malfunction is detected as determined at decision block 154, the process returns to the monitoring at block 152. Alternatively, if a defect or malfunction is detected as determined at decision block 154, a token or trouble ticket is generated to identify the failed machine and the associated problem at block 156. At decision block 158, a determination is made as to whether to attempt to repair the problem. For example, the automatic process 150 may be configured with various rules to determine what repairs, if any, are to be performed on the failed machine or the particular software or hardware component of the identified machine. For example, the amount or number of repairs may be limited for the overall computer network, for particular types of problems such as memory problems, disk drive problems, etc., and/or for the types of machines such as index servers, cache servers, front end servers, balancers, etc. Additionally or alternatively, the process 150 may be configured with rules that determine whether and what repairs to perform based on the severity, history, and/or frequency of the problem, for example.

If the detected problem is one that the process 150 will attempt to repair or replace as determined at decision block 158, the type of problem (e.g., repair action or replacement action) may be classified. If the prescribed action is a repair action as determined at decision block 160, the repair action is performed at block 162. The process 150 then returns to the monitoring at block 152 which determines whether the repair action performed at block 162 was successful. If the attempted repair is successful, the monitoring at block 152 would not detect the problem again. However, if the attempted repair is unsuccessful, then the monitoring at block 152 again generates the token or trouble ticket at block 156. Note that as discussed above, the number of times and/or when previous repair action(s) were made may be monitored in order to manage the frequency of the repair (i.e., how soon after the previous repair should the repair action be performed again) and/or whether to issue a replacement action such as when the maximum number of the repairs (e.g., repair of the same problem and/or the same repairs for the particular machine, etc.) is reached. For example, the process 150 may determine at block 158 that the maximum number, e.g., 5, of repair actions is reached, and modifies the token to indicate that the problem is not repairable (and thus may be replaced) and forwards the token back to the monitoring at block 152.

Alternatively, if the prescribed action is replacement as determined at decision block 160, the best match replacement machine for the failed machine is identified and assigned from a pool of available replacement machines at block 166. In particular, at block 166, the configuration of the failed machine may be determined by performing a lookup based on the identification of the failed machine in a database of all machines in the computer network and their configurations. The best match replacement machine may then be selected from a pool of available replacement machines in the database based on the configuration of the failed machine. The best match replacement machine may be the machine most similar in configuration to that of the failed machine. As an example, the best match replacement machine may be selected to have the closest but at least the same or better configuration for each parameter, e.g., processor speed, disk drive size, and/or amount of RAM, etc. Alternatively, the best match replacement machine may be selected to have the closest but at least the same or better configuration for only certain predetermined parameters, e.g., same or better processor speed but disk drive size may be irrelevant or may be any size greater than 20 GB despite that the failed machine has a disk drive size of 40 GB.

Next, at block 168, data from another copy of the failed machine, for example, another copy of the same index server or same balancer, is copied onto the newly identified and assigned replacement machine. As is evident, the copy of the failed machine should be operational, i.e., no fault detected. At block 170, a new configuration file is generated that takes into account the replacement of the failed machine with the new replacement machine in the computer network. At block 172, the machines in the failed machine's chain of dependency are modified, updated or installed with the new configuration file. As noted above, the failed machine's chain of dependency includes the other machines in the computer network that are affected by the replacement of the failed machine, typically those hierarchically higher in the computer network than the failed machine. Finally, at block 174, the modified dependent machines may be restarted in order for the new configuration to take effect. Depending on the configuration of the computer network and/or the replacement and its dependent machines, for example, the restart of the modified dependent machines may be staggered relative to one another so as to ensure that the computer network system remains functional during the restart, i.e., during the installation of the new replacement machine. Once the new replacement machine is installed in the computer network, automatic replacement of the failed machine is complete.

Figure 4:
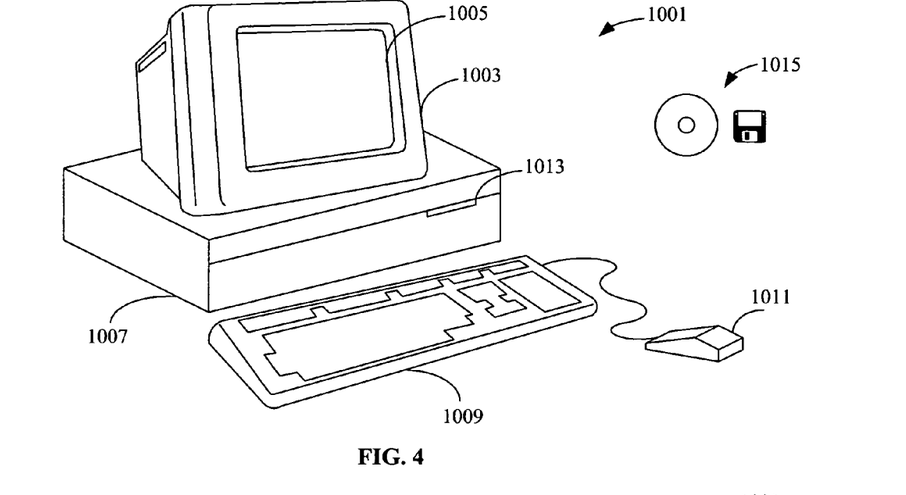
FIG. 4 illustrates an example of a computer system that can be utilized with the various embodiments of method and processing described herein.
Figure 5:
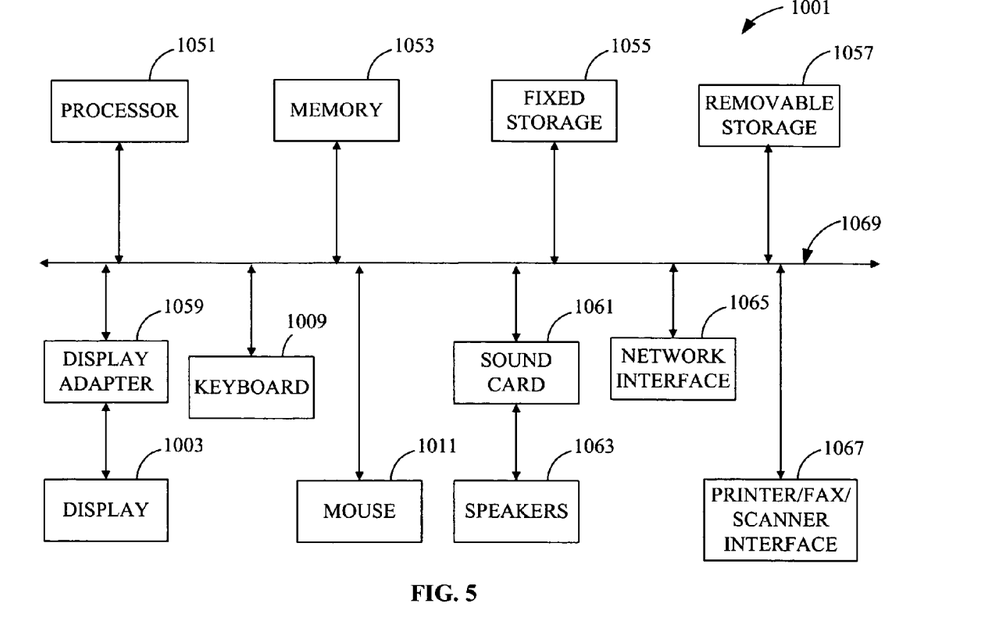
FIG. 5 illustrates a system block diagram of the computer system of FIG. 4.

FIGS. 4 and 5 illustrate a schematic and a block diagram, respectively, of an exemplary general purpose computer system 1001 suitable for executing software programs that implement the methods and processes described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A system for automatic replacement of machines in a computer network, comprising:
   a database of configuration information, the database including configuration information for a plurality of available replacement machines and for a failed machine;
   a machine assignment device in communication with the database and configured to identify and assign one of the plurality of available replacement machines as a replacement machine for the failed machine based on a comparison of the configuration information for the failed machine to those for the plurality of available replacement machines; and
   a configuration device in communication with the machine assignment device for generating configuration data for replacement of the failed machine with the replacement machine in the computer network.

2. The system of claim 1, wherein the database of configuration information includes configuration information for active machines in the computer network.

3. The system of claim 1, further comprising:
   an installation device in communication with the configuration device and configured to cause the configuration data generated by the configuration device to take effect in at least some of the machines other than the failed machine in the computer network.

4. The system of claim 3, wherein the installation device is further configured to cause the configuration data to take effect in machines in the computer network that are dependent upon the failed machine.

5. The system of claim 1, wherein the machine assignment device is further configured to compare a predetermined set of configuration parameters of the failed machine to those of the available replacement machines.

6. The system of claim 5, wherein the predetermined set of configuration parameters includes at least one of processor speed, disk drive size, and amount of random access memory (RAM).

7. The system of claim 1, further comprising:
   a detection device configured to detect fault in at least one of a software component and a hardware component in the machines in the computer network, wherein upon detection of the fault in the failed machine, the machine assignment device identifies and assigns the replacement machine.

8. The system of claim 7, further comprising:
   a repair device configured to attempt to repair the fault identified by the detection device in the failed machine.

9. The system of claim 1, further comprising:
   a replacement device configured to copy data from a copy of the failed machine in the computer network into the replacement machine identified by the machine assignment device.

10. The system of claim 9, wherein the failed machine and the copy of the failed machine in the computer network include components selected from the group consisting of a front end server, a load balancer, an index server, and a cache server.

11. A method for automatic replacement of machines in a computer network, comprising:
    identifying a failed machine in the computer network;
    performing a lookup in a database of configuration information containing configuration information for a plurality of available replacement machines and for the failed machine;
    identifying and assigning a replacement machine selected from the available replacement machines, the identifying and assignment being based on a comparison of the configuration information for the failed machine to those of the plurality of available replacement machines; and
    generating configuration data for replacement of the failed machine with the replacement machine in the computer network.

12. The method of claim 11, wherein the database of configuration information includes configuration information for active machines in the computer network.

13. The method of claim 11, further comprising:
    causing the configuration data generated to take effect in at least some of the machines other than the failed machine in the computer network.

14. The method of claim 13, wherein the causing includes causing the configuration data to take effect in machines in the computer network that are dependent upon the failed machine.

15. The method of claim 11, wherein the identifying and assignment includes comparing a predetermined set of configuration parameters of the failed machine to those of the available replacement machines.

16. The method of claim 15, wherein the predetermined set of configuration parameters includes at least one of processor speed, disk drive size, and amount of random access memory (RAM).

17. The method of claim 11, wherein the identifying includes detecting fault in at least one of a software component and a hardware component in the machines in the computer network.

18. The method of claim 17, further comprising:
    attempting to repair the identified fault in the failed machine, wherein upon unsuccessful repair of the failed machine, the performing, the identifying and assigning, and the generating are performed.

19. The method of claim 11, wherein the unsuccessful repair is after a predetermined maximum number of performing the attempting to repair.

20. The method of claim 11, further comprising:
    copying data from a copy of the failed machine in the computer network into the replacement machine.

21. The method of claim 20, wherein the failed machine and the copy of the failed machine in the computer network include components selected from the group consisting of a front end server, a load balancer, an index server, and a cache server.

22. A computer program product embodied on a computer-readable storage medium, the computer program product including instructions which when executed by a computer system are operable to cause the computer system to perform acts comprising:
    identifying a failed machine in the computer network;
    performing a lookup in a database of configuration information containing configuration information for a plurality of available replacement machines and for the failed machine;
    identifying and assigning a replacement machine selected from the available replacement machines, the identifying and assignment being based on a comparison of the configuration information for the failed machine to those of the plurality of available replacement machines; and
    generating configuration data for replacement of the failed machine with the replacement machine in the computer network.

23. The computer program product of claim 22, wherein the database of configuration information includes configuration information for active machines in the computer network.

24. The computer program product of claim 22, further including instructions operable to cause the computer system to perform acts comprising:
causing the configuration data generated to take effect in at least some of the machines other than the failed machine in the computer network.

25. The computer program product of claim 24, wherein the causing includes causing the configuration data to take effect in machines in the computer network that are dependent upon the failed machine.

26. The computer program product of claim 22, wherein the identifying and assignment includes comparing a predetermined set of configuration parameters of the failed machine to those of the available replacement machines.

27. The computer program product of claim 26, wherein the predetermined set of configuration parameters includes at least one of processor speed, disk drive size, and amount of random access memory (RAM).

28. The computer program product of claim 22, wherein the identifying includes detecting fault in at least one of a software component and a hardware component in the machines in the computer network.

29. The computer program product of claim 28, further including instructions operable to cause the computer system to perform acts comprising:
attempting to repair the identified fault in the failed machine, wherein upon unsuccessful repair of the failed machine, the performing, the identifying and assigning, and the generating are performed.

30. The computer program product of claim 29, wherein the unsuccessful repair is after a predetermined maximum number of performing the attempting to repair.

31. The computer program product of claim 22, further including instructions operable to cause the computer system to perform acts comprising:
copying data from a copy of the failed machine in the computer network into the replacement machine.

32. The computer program product of claim 31, wherein the failed machine and the copy of the failed machine in the computer network include components selected from the group consisting of a front end server, a load balancer, an index server, and a cache server.

* * * * *